United States Patent
Rangan et al.

(10) Patent No.: US 9,262,140 B2
(45) Date of Patent: *Feb. 16, 2016

(54) PREDICATION SUPPORTING CODE GENERATION BY INDICATING PATH ASSOCIATIONS OF SYMMETRICALLY PLACED WRITE INSTRUCTIONS

(75) Inventors: Ram Rangan, Austin, TX (US); Mark W. Stephenson, Austin, TX (US); Lixin Zhang, Austin, TX (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1371 days.

This patent is subject to a terminal disclaimer.

(21) Appl. No.: 12/123,083

(22) Filed: May 19, 2008

(65) Prior Publication Data

US 2009/0288063 A1 Nov. 19, 2009

(51) Int. Cl.
*G06F 9/45* (2006.01)

(52) U.S. Cl.
CPC .................... *G06F 8/4451* (2013.01)

(58) Field of Classification Search
CPC ....... G06F 9/44; G06F 9/4421; G06F 9/4423; G06F 9/4425; G06F 8/44; G06F 8/441; G06F 8/4451
USPC .......................... 717/130–132, 138
See application file for complete search history.

(56) References Cited

U.S. PATENT DOCUMENTS

| | | | |
|---|---|---|---|
| 5,920,716 A * | 7/1999 | Johnson et al. ............... | 717/141 |
| 6,170,052 B1 * | 1/2001 | Morrison ...................... | 712/236 |
| 6,442,679 B1 | 8/2002 | Klauser et al. | |
| 6,944,853 B2 * | 9/2005 | Topham ......................... | 717/158 |
| 7,267,719 B2 * | 9/2007 | Lunden et al. ................. | 106/464 |
| 7,269,719 B2 * | 9/2007 | Colavin et al. ................ | 712/226 |
| 7,886,132 B2 * | 2/2011 | Rangan et al. ................ | 712/220 |
| 2004/0205326 A1 | 10/2004 | Sindagi et al. | |
| 2005/0055541 A1 | 3/2005 | Aamodt et al. | |
| 2006/0230259 A1 | 10/2006 | Ahmed et al. | |
| 2009/0037161 A1 | 2/2009 | Agarwal et al. | |

OTHER PUBLICATIONS

Office Action in U.S. Appl. No. 12/123,046 mailed Jun. 3, 2010.

(Continued)

*Primary Examiner* — Shew-Fen Lin
*Assistant Examiner* — Sergio J Curbelo, III
(74) *Attorney, Agent, or Firm* — Mitch Harris, Atty at Law, LLC; Andrew M. Harris; William J. Stock

(57) ABSTRACT

A predication technique for out-of-order instruction processing provides efficient out-of-order execution with low hardware overhead. A special op-code demarks unified regions of program code that contain predicated instructions that depend on the resolution of a condition. Field(s) or operand(s) associated with the special op-code indicate the number of instructions that follow the op-code and also contain an indication of the association of each instruction with its corresponding conditional path. Each conditional register write in a region has a corresponding register write for each conditional path, with additional register writes inserted by the compiler if symmetry is not already present, forming a coupled set of register writes. Therefore, a unified instruction stream can be decoded and dispatched with the register writes all associated with the same re-name resource, and the conditional register write is resolved by executing the particular instruction specified by the resolved condition.

20 Claims, 4 Drawing Sheets

(56) References Cited

OTHER PUBLICATIONS

Notice of Allowance in U.S. Appl. No. 12/123,046 mailed Sep. 30, 2010.

A. Darsch, et. al., "Out-of-order Predicated Execution with Translation Register Buffer", Technical Report No. 5011, Nov. 2003, Institut National de Recherche en Informatique et en Automatique, Rennes, France.

H. Kim, et al. "Diverge-merge processor: Generalized and energy-efficient dynamic predication", IEEE Micro 27(1), 2007, pp. 94-104, IEEE Press, US.

V. Sachdeva, et al., "Characterizing and Improving the Performance of Bioinformatics Workloads on the POWER5 Architecture", pp. 89-97, International Symposium on Workload Characterization, Sep. 2007, IEEE Press, Boston, MA.

Mahlke, "A Comparison of Full and Partial Predicated Execution Support for ILP Processors", ISCA-22, Jun. 1995, pp. 1-12, International Society for Computers and Their Applications, Cary, NC, US.

Wang, et al. "Register Renaming and Scheduling for Dynamic Execution of Predicated Code", Proceedings of HPCA, 2001, pp. 15-26, IEEE Computer Society, US.

* cited by examiner

PREDICATION SUPPORTING CODE GENERATION BY INDICATING PATH ASSOCIATIONS OF SYMMETRICALLY PLACED WRITE INSTRUCTIONS

CROSS-REFERENCE TO RELATED APPLICATIONS

The present application is related to U.S. patent application Ser. No. 12/123,046, entitled "PREDICATION SUPPORT IN AN OUT-OF-ORDER PROCESSOR BY SELECTIVELY EXECUTING AMBIGUOUSLY RENAMED WRITE OPERATIONS" filed concurrently herewith by the same inventors and which issued as U.S. Pat. No. 7,886,132 on Feb. 8, 2011. The above-referenced U.S. Patent Application is incorporated herein by reference.

BACKGROUND OF THE INVENTION

1. Field of the Invention

The present invention is related to compiler/translator methods, systems and programs, and more specifically to techniques for supporting predication in out-of-order processors by generating code having symmetrically placed write operations and indications of their conditional execution path associations.

2. Description of Related Art

Out-of-order instruction processing architectures are prevalent in present-day processors and provide efficient use of available processing resources. By not rigidly restricting the order in which groups of instructions (or individual instructions) are decoded and/or executed, processing resources can be used more efficiently, resulting in either greater computation power, or reduced intervals in which a processing system must be operated out of standby or other power-conserving mode. However, when the processing of a particular instruction is "predicated" on the results of a conditional instruction, without additional predication logic, the processor must typically stall waiting for the condition to be resolved prior to executing the particular instruction. Predication support logic provides mechanisms for avoiding the stall requirement, but the inclusion of predication support complicates the processor logic greatly. Static predication, in which the compiler specifically delineates regions of program code as belonging to different conditional paths, solves the problem of stalling, but requires additional resources and logic to discard instructions and/or results associated with "not-taken" instruction paths and to resolve the dependencies of values on the conditional branches to the "taken" path results. Also, static predication typically requires that each instruction of the instruction set architecture (ISA) have a mechanism, such as an operand or field that provides the path association information. Not all ISAs provide such support and it is a non-trivial problem to include such support in ISAs.

Typical predication logic tracks instructions through various pipelines in the processor and ensures that if a potentially invalid result is computed by relying on a value that was determined from a condition that was not properly resolved at the time of computation, the potentially invalid result can be replaced. Special tags are used to indicate that a value is bifurcated and that a final register or memory value is split between two or more possible results. The flag causes the processor logic to avoid committing the result until the branch or other dependency is finally resolved. The logic and resources to accomplish the above-described predication handling are generally centered around the register renamer, the issue unit, the write-back unit and the completion unit, as the rename process generates ambiguous locations that each represent a possible result of execution and the proper result must be identified and resolved to the final register/memory location. The rename process described above also requires additional rename resource when handling predicated values in out-of-order execution, since multiple rename registers must be used to represent the same value. Some predication techniques insert special instructions to merge the results from the conditional paths, and other techniques provide additional levels of indirection to handle ambiguous values, thereby introducing machine overhead in non-predicated instruction handling, as well.

Therefore, it would be desirable to handle predication in an out-of-order processor without requiring complex logic, an increased number of rename resources, or stalling instruction decoding/dispatching until conditions that control dependencies are resolved.

BRIEF SUMMARY OF THE INVENTION

The invention is embodied in a processor, computer system, computer program product and method that indicate instruction path associations in the binary program code.

A predicated region identifier op-code specifies the number of predicated instructions that follow, identifying a predicated region, and an associated field or value indicates to which paths each instruction belongs. Therefore, each region contains instructions for two or more conditional paths of execution. The region identifier and mask may be included in operand fields or an instruction op-code or may form a special op-code that provides the predication information. A compiler generates program code for the processor of the present invention such that for each register write in the predicated region, a corresponding register write is included for the other path(s), forming a coupled set of register writes. The compiler inserts additional register writes if symmetry is not already present in the register write instructions. In the processor, a rename resource is associated with the same register, but only one of the register writes will actually be executed in each coupled set as dictated by a resolved condition. Therefore, the instruction stream is unified and can be decoded/dispatched and only one of the register write instructions is executed as determined by resolution of the condition as indicated by a signal provided to the pipeline.

The foregoing and other objectives, features, and advantages of the invention will be apparent from the following, more particular, description of the preferred embodiment of the invention, as illustrated in the accompanying drawings.

BRIEF DESCRIPTION OF THE SEVERAL VIEWS OF THE DRAWING

The novel features believed characteristic of the invention are set forth in the appended claims. The invention itself, however, as well as a preferred mode of use, further objectives, and advantages thereof, will best be understood by reference to the following detailed description of the invention when read in conjunction with the accompanying Figures, wherein like reference numerals indicate like components, and:

DETAILED DESCRIPTION OF THE INVENTION

The present invention relates to methods and programs for generating program code executable by processors and processing systems in which out-of-order instruction processing is supported. A special operation code marks regions of predicated operations that include at least one instruction. Associated with the special operation code, either in fields within the operation code or in an operand, information is included identifying to which conditional path each instruction in the region belongs and the length of the region. Additional register write operations are inserted to provide that symmetrical register write operations (i.e., writes to the same register) are present for each conditional path within the region, forming sets of register write operations. If writes to the same register are present in each of the conditional execution paths, then the writes can be "paired" and no write instruction insertion is needed to provide symmetry. The processor decodes the instructions and may dispatch the instructions to execution units in one or more pipelines. The rename resource associated with each set of write operation is the same. The pipeline (s) ensure that only one of the write operations in each set is executed in conformity with the resolved condition associated with the conditional execution paths, so that no write-back or other merging of the rename registers is required.

Figure 1:
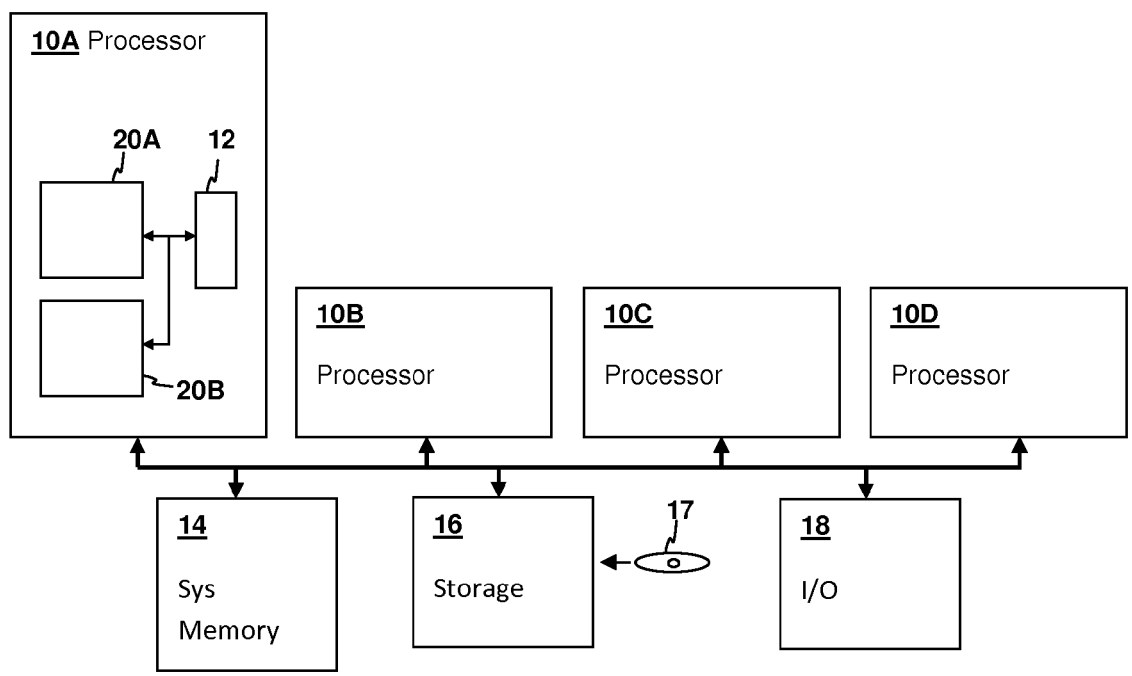
FIG. 1 is a block diagram illustrating a processing system in which program code according to an embodiment of the present invention may be generated and executed.

Referring now to FIG. 1, a processing system for executing program code generated in accordance with an embodiment of the present invention is shown. The depicted processing system includes a number of processors 10A-10D, each in conformity with an embodiment of the present invention. The depicted multi-processing system is illustrative, and processing system in accordance with other embodiments of the present invention include uni-processor systems. Processors 10A-10D are identical in structure and include cores 20A-20B and local storage 12, which may be a cache level, or a level of internal system memory. Processors 10A-10B are coupled to main system memory 14, a storage subsystem 16, which includes non-removable drives and optical drives, for reading media such as a CD-ROM 17 containing program instructions implementing a compiler for generation of program code for execution by processors 10A-10D. The illustrated processing system also includes input/output (I/O) interfaces and devices 18 such as mice and keyboards for receiving user input and graphical displays for displaying information. While the system of FIG. 1 is used to provide an illustration of a system for executing program code generated in accordance with the present invention and to provide an illustration of a system on which a compiler may be executed to provide program code in accordance with an embodiment of the present invention, it is understood that a compiler or code translator in accordance with an embodiment of the present invention may be executed by another general-purpose or special-purpose computer system that does not include the architectural features described in further detail below.

Figure 2:
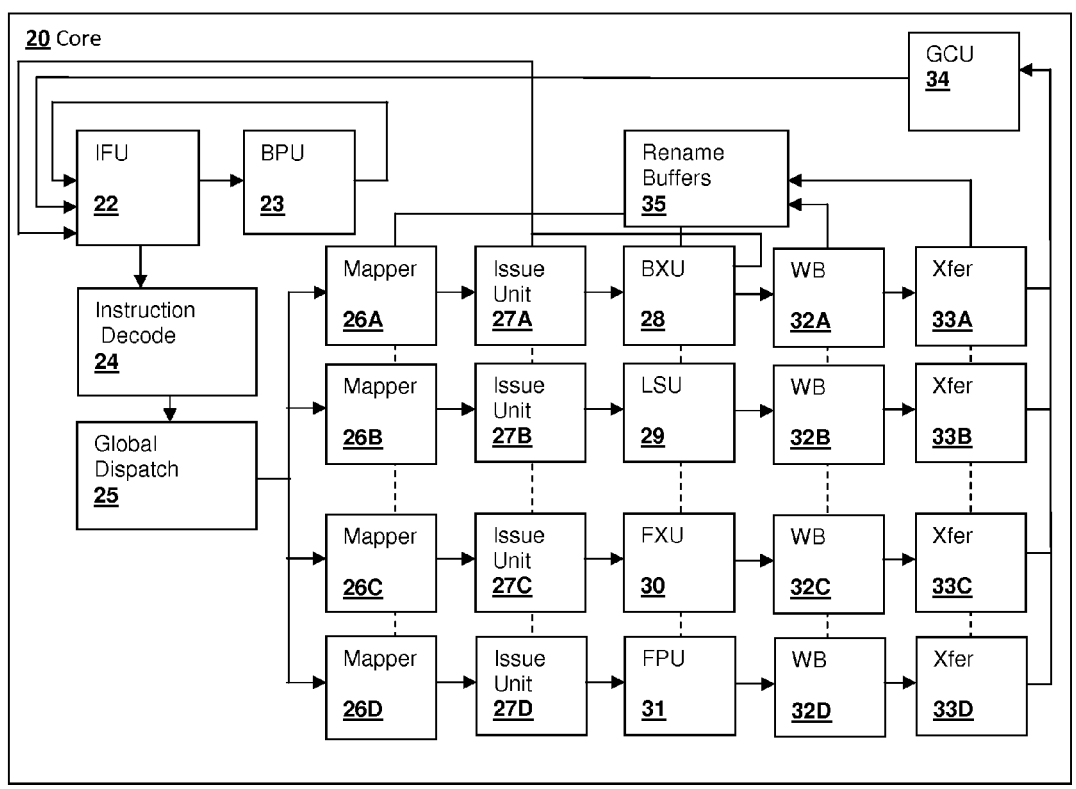
FIG. 2 is a block diagram illustrating a processor for executing program code generated in accordance with an embodiment of the present invention.

Referring now to FIG. 2, details of processor cores 20A-20B of FIG. 1 are illustrated in depicted core 20. Core 20 includes an instruction fetch unit (IFU) 22 that fetches an instruction stream from cache or system memory and presents the instruction stream to an instruction decode unit 24. IFU 22 is informed by a branch prediction unit 23 which indicates which instructions to fetch according to branch history information. However, branch-prediction informed fetching is not a requirement of the present invention, as the techniques of the present invention can be applied in processors that fetch conditional code according to any technique that provides for fetching some program code for which conditionally-executed program paths are present (i.e., any scheme in which instruction fetch is not predicated upon complete conditional path resolution). A global dispatch unit 25 dispatches the decoded instructions to a number of internal processor pipelines. The processor pipelines each include a mapper 26A-26D, an issue unit 27A-27D, an execution unit, one of branch execution unit (BXU) 28, load/store unit (LSU) 29, fixed-point unit (FXU) 30 or floating point unit (FPU) 31, a write back unit (WB) 32A-32D and a transfer unit (Xfer) 33A-33D. A global completion unit (GCU) 34 provides an indication when result transfer is complete to IFU 22. Mappers 26A-26D allocate rename buffers 35 to represent registers or "virtual registers" indicated by instructions decoded by instruction decode unit 24 so that concurrent execution of program code can be supported by the various pipelines. Out-of-order execution is also supported by the use of rename buffers 35 as the register values are fully virtualized by the action of mappers 26A-26D. WBs 32A-32D write pipeline results back to associated rename buffers 35 and Xfers 33A-33D provide an indication that write-back is complete to GCU 34 so that pipeline results are synchronized with the execution and instruction fetch process.

In the illustrated core 20, the instruction stream fetched by IFU 22 contains special conditional region identifying operators that specify the length (instruction count) of a following region of instructions, a bit field indicating one of two conditional paths of execution to which the following instructions are members and a flag indicating the state of a signal provided by BXU 38 to issue units 27A-27D that indicates resolution of a branch condition in favor of the conditional executed path's predicated instructions specified by the matching state in the bit field. While illustrated processor core 20 uses fields within the conditional region identifying operator to provide the instruction count, membership and condition flag information, any or all of the above information may be provided in operands associated with the conditional region identifying operator, for example, in a special predication register that contains the information. Further, while illustrated processor core 20 provides two conditional execution paths per region, more than two conditional execution paths may be supported by the program code in accordance with an embodiment of the present invention by using a field that either has multiple values for each instruction, so that the membership value can specify more than two conditional paths, or by ordering the instructions within the region and using bit positions to indicate the positions at which the boundaries between contiguous groups of instructions for each conditional path.

The regions of predicated instructions also have a special format. Any register-writing operation in one of the conditional paths is matched with another instruction that writes the same register in each of the other conditional paths. If a particular register is written-to in one conditional path and not in one or more of the others, according to original program code, a compiler or translator in accordance with an embodiment of the present invention inserts additional instructions that write to that register in the conditional paths that did not originally write to, or otherwise modify, the particular register. For example, "NOP move" instructions such as mov R0,R0 can be inserted in order to include a write operation with a result written to register R0 on other conditional execution paths when an instruction that writes to register R0 is present in the original program code for one of the conditional execution paths. If one instruction writes to multiple registers in one of the conditional execution paths, one or more pairing instructions can be added to each of the other conditional execution paths. During instruction decode, mappers 26A-26D then allocate the same rename resource to represent the register, creating an ambiguity that is resolved by selectively executing only the instructions belonging to the to-be-taken conditional execution path indicated by the output of BXU 28. Mappers 26A-26D also write a region ID to a tag field in the entry in issue units 27A-27D, so that the particular region is identified and instructions conditioned upon the values implicated by the conditional region can be properly sequenced. The above described operations permit instructions to be fully decoded and issued to issue units 27A-27D (which contain the necessary issue queues), and a pipeline will only stall if the result from BXU 28 is not available at the time the predicated instructions have become the oldest instructions in the corresponding issue queue and no other "younger" instructions present in the issue queue are ready to issue. Such operation is preferable to stalling prior to instruction decode, which can take a large number of machine cycles to complete, and further provides a simpler architecture than typical no-stall (or more properly stall-after execution) implementations, which require bifurcating the register values across multiple rename resources and then merging the result once the to-be-taken conditional execution path is resolved. The program code generated by present invention therefore reduces the resources required to represent registers and the resources/power wasted in executing instructions for not-taken paths, while avoiding stalling at the decode/rename stage of execution, and also permits younger instructions to execute before the predicated instructions.

An exemplary set of program code in accordance with a traditional renaming scheme is illustrated in Table I, below.

TABLE I

Traditional Renaming

| | Generated Code | | Run-time Renamed Code |
|---|---|---|---|
| | blt cr0, tag1 | | blt cr0, tag1 |
| | li R12, 0 | | |
| | b tag2 | | |
| tag1 | neg R0, R0 | tag1 | neg PR3, PR2 |
| | li R12, 8 | | li PR4, 8 |
| tag2 | add R0, R0, R12 | tag2 | add PR5, PR3, PR4 |

The unmapped set of instructions branch to tag1 if the negative condition flag is set, zeroing register 0 and load an immediate 8 value into register 12. If the negative condition flag is not set, a zero value is loaded into register 12. Finally register 0 is incremented by the value loaded into register 12. In the traditional rename example shown in the right column of Table 1, only one conditional execution path is renamed by the rename mapper(s). While early processors stalled instruction fetch upon encountering a branch instruction, present-day processors generally support speculative fetching, in which instructions for one of two conditional execution paths are fetched based upon a speculation as to which branch path is more probable. Remedial action is taken later if the speculation is found to be incorrect, typically by flushing the pipeline(s) and fetching the instructions for the non-predicted conditional execution path. As an illustration of the above-described behavior, the run-time renamed program code in the right-hand column of Table I illustrates a speculation that the <blt cr0, tag1> instruction will transfer control to the instructions commencing at tag1. Consequently, physical resources corresponding to the instruction <li R12, 0> are not shown, since the instruction is not fetched and no registers are renamed for that instruction. Register 12 is mapped to physical register (rename resource) PR4 on the speculated control-flow path, which must be resolved prior to its use in the final add instruction located at tag2. Similarly, assuming the current mapping of register R0 is PR2, the source register R0 of the add instruction is renamed to physical resource PR2 and the destination register R0 is assigned a new physical resource PR3.

An exemplary set of program code in accordance with an embodiment of the present invention is illustrated in Table II, below.

TABLE II

Ambiguous Renaming

| Represented Code | | Generated Code | Run-time Renamed Code |
|---|---|---|---|
| | blt cr0, tag1 | emask-lt, 4, 0b1010, cr0 | emask-lt, 4, 0b1010, cr0 |
| | li R12, 0 | neg R0, R0 | neg PR3, PR2 |
| | b tag2 | or R0, R0, R0 | or PR3, PR2, PR2 |
| tag1 | neg R0, R0 | li R12, 8 | li PR4, 8 |
| | li R12, 8 | li R12, 0 | li PR4, 0 |
| tag2 | add R0, R0, R12 | add R0, R0, R12 | add PR5, PR3, PR4 |

In the exemplary program code the present invention, labeled "ambiguous renaming" in Table II, the middle column labeled "generated code" illustrates program code in accordance with an embodiment of the present invention, that has been generated for the processor by a compiler or translator from the "represented code" in the left-hand column of Table II, which is identical to the "generated code" illustrated in Table I. The compiler or the translator in accordance with the illustrated embodiment ensures that the two mutually exclusive control-flow paths have identical sets of writes to registers. Since the register R0 is not written by the instructions along the conditional execution path corresponding to the a branch-not-taken for instruction <blt cr0, tag1>, the compiler or the translator inserts a no-effect operation (called a "no-op") in the form of <or R0,R0,R0> the generated code column of Table II. Both conditional execution paths write to register R12, and consequently, there is no need to insert additional "no-effect" operations that write to register R12. Exemplary run-time renamed code, resulting from mapping program code in accordance with the present invention in the above-described processor, is shown in the right-hand column of Table II. Instructions in the region predicated by the <emask-lt> instruction are all subjected to ambiguous renaming such that destination registers of every adjacent pair of instructions are mapped to the same physical resource. The <neg> and <or> instructions renamed to write to physical resource PR3. The two <li> instructions are renamed to write to physical resource PR4. Dynamically, upon resolution of the emask's control flow predicate, only one of the two mutually exclusive conditional execution paths will be taken. Therefore, the processor can discard (or alternatively ignore) instructions for the not-taken conditional execution path, leaving a single unique write instruction for each physical resource mapped to receive the results of the write instructions. The <add> instruction at the end is outside of the predicated region delineated by the <emask-lt> operation code. Therefore, the registers specified by the <add> instruction are renamed according to traditional rename rules.

Source registers R0 and R12 are mapped to physical resource PR3 and PR4 respectively, and a new physical resource PR5 is assigned to the destination register R0 for the <add> instruction.

Figure 3:
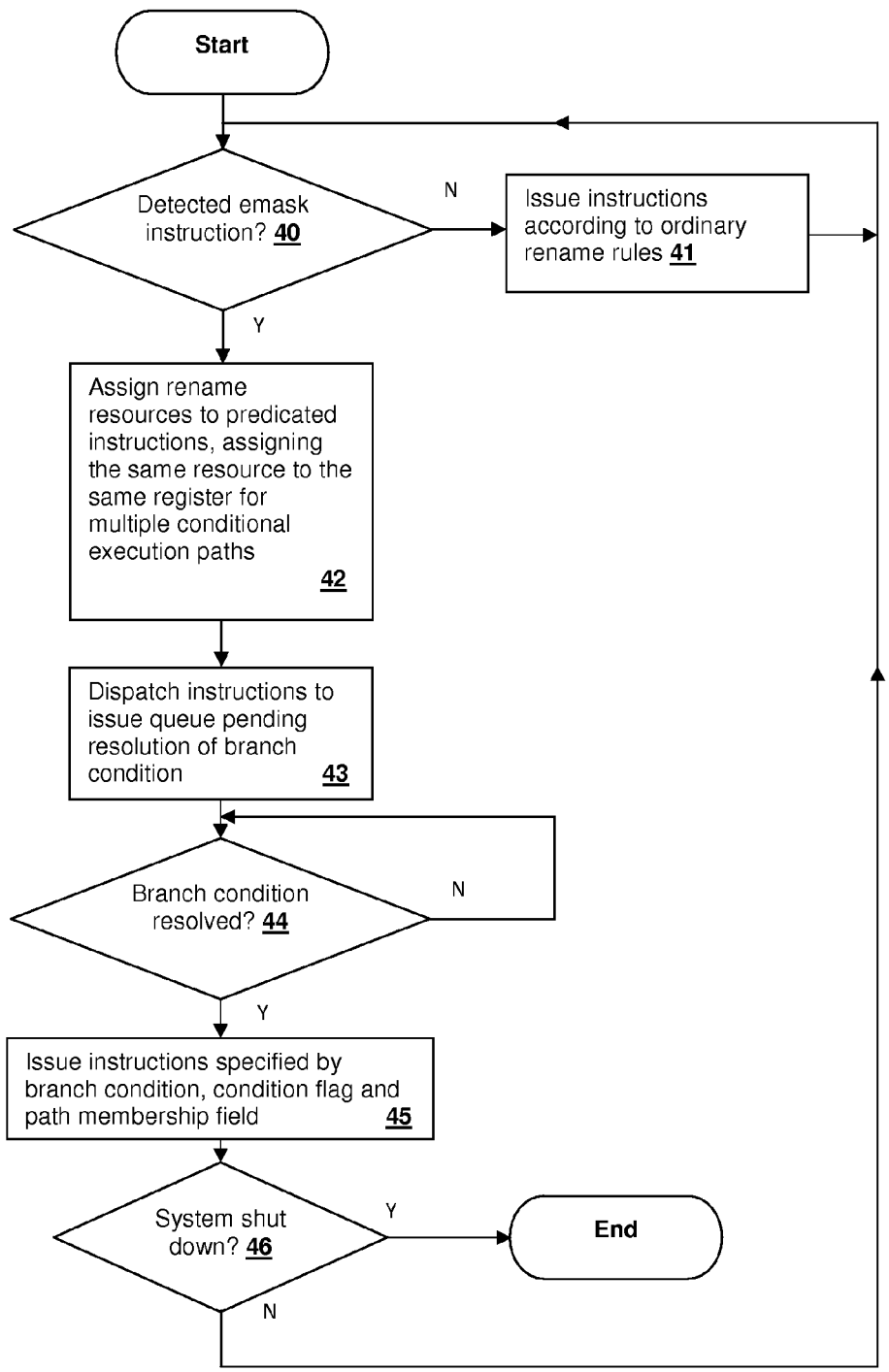
FIG. 3 is a flow chart depicting a method of executing program code generated in accordance with an embodiment of the present invention.

In the example illustrated above in Table II, no selective write-back or resolution of the mapped values is required, as the final add instruction depends only on the values of physical registers PR3 and PR4, which are assigned values by the instructions for both of the conditional execution paths, although only the instructions for the "taken" path will actually be executed in the pipelines. Referring now to FIG. 3, a method of execution, within a processor, of program code generated in accordance with an embodiment of the present invention is shown. Until an emask instruction is detected (decision 40) issue and execution proceeds according to ordinary rename rules (step 41). When an emask instruction is detected (decision 40), rename resources are assigned to predicated instructions such that the same resource is assigned to the same register for the multiple conditional execution paths (step 42). Then, the instructions are dispatched to issue queues pending resolution of the associated branch condition (step 43) and until the branch condition is resolved (decision 44) the associated predicated instructions stall at the issue stage. Once the branch condition is resolved (decision 44) the instructions are issued as specified by the value of the branch condition, the branch condition flag and the membership field bit values that indicate which instructions should be issued (step 45). Until the system shuts down (step 46), execution proceeds in the manner illustrated above. It is understood that the flowchart of FIG. 3 illustrates the processing of a single predicated region of instructions for a single pipeline and that parallel execution continues for other pipelines and for the decode of additional instructions for the stalled pipeline even while the branch condition is unresolved in decision 44.

Figure 4:
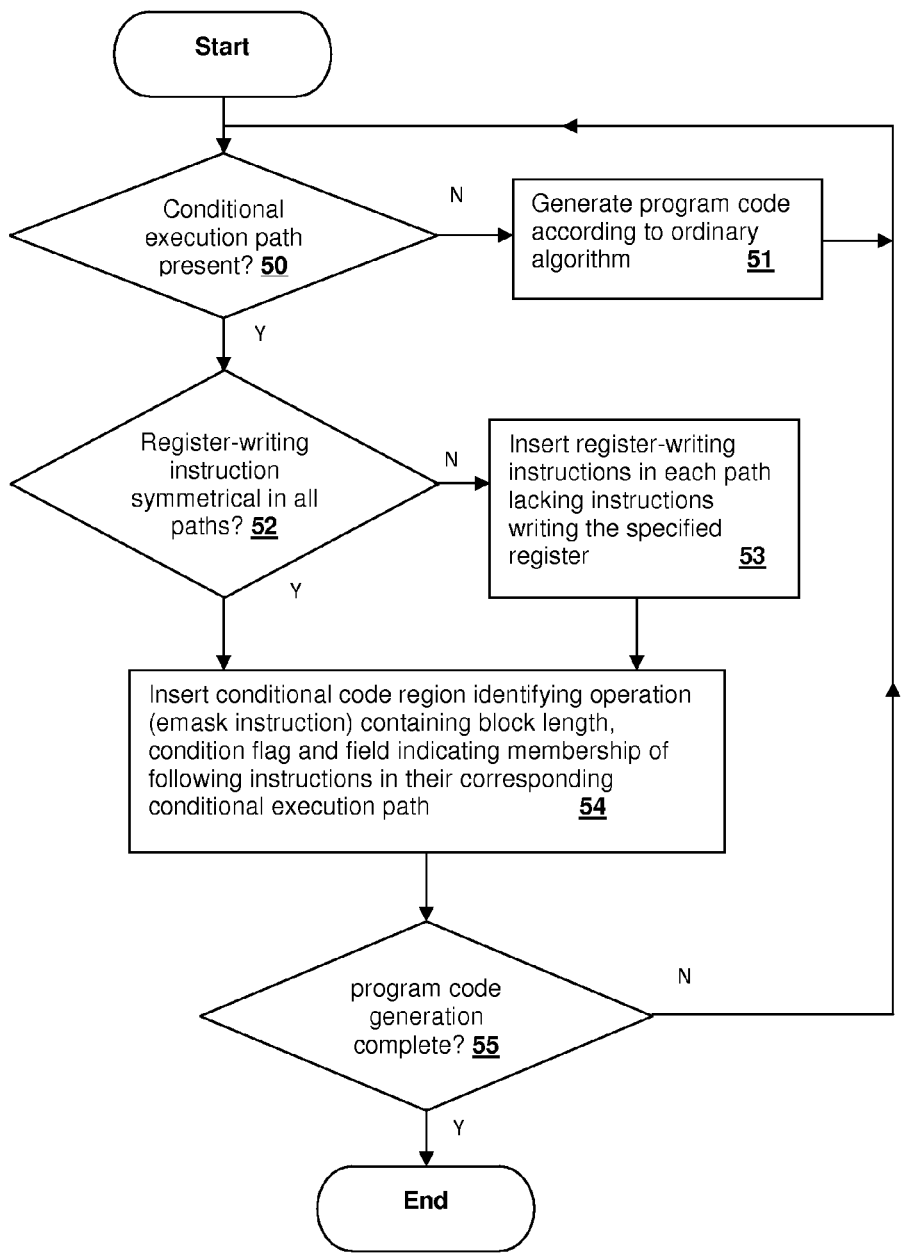
FIG. 4 is a flow chart depicting a method of generating program code in accordance with an embodiment of the present invention.

Referring now to FIG. 4, a method for generating program code in accordance with an embodiment of the present invention is shown. The method can be performed as a final step in the compilation of a higher-level language description, may be integrated in the high-level processing of an abstract language, or may be employed in a machine-level translation program that "ports" existing machine code. If the method is implemented as part of a compiler, then the method will generally be informed by the branch control information provided by the pseudo-code model. If the method is employed by a machine language translator, the machine code will need to be parsed to determine all of the conditional paths that are present, to ensure that subroutine calls and branching are not generating nesting conditions that can disrupt the processing of the predicated regions. Generally, nesting of predicated regions is avoided, although such nesting can be handled with additional logic, and due to stack requirements, program calls are generally not included within the predicated regions. Some regions of program code having conditional execution paths may not be amenable to identification as predicated regions for application of the techniques of the present invention, and therefore are generally handled in the traditional re-name manner without ambiguity in the rename resource allocation. Example of such program code regions are regions including a number of predicated paths that exceed the capabilities of the architecture, since each predicated path must be identified uniquely, the number of predicated paths is generally limited to a particular number. Other examples include predicated paths that include backward branching, e.g., loops having conditional execution paths included within them. Input program code (or pseudo-code) is received and if a conditional execution path is not present (decision 50), output program code is generated according to the ordinary machine code generation algorithm (step 51). If a conditional execution path is detected (decision 50), the paths are checked for register-writing instruction symmetry (decision 52). If all of the paths are not symmetric with respect to written-to registers (decision 52), additional register-writing instructions are inserted in paths that lack the register writing instructions (step 53). Next the conditional code region identifying operation (emask instruction) is inserted with the region length, condition flag and field indicating membership of the following instructions in their corresponding conditional execution paths (step 54). Until program code generation is complete (decision 55), steps 50-54 are repeated.

While the code-generation and processor architecture examples given above are a specific example of an application of the present invention, it is understood that other techniques in accordance with other embodiments of the present invention may be applied. For example, the region count would not be needed in the above-illustrated emask instruction if another region-ending operation code were used at the end of each region. Further, the alternating of instructions for the conditional paths and one-to-one correspondence of the bit field and register writing instructions is not a requirement, but facilitates the implementation of the issue logic. For example, the instructions for one conditional path and another conditional path may form contiguous portions of the region and the membership information may be an index to the first instruction of the second portion of the region or other indicator of the start of the other conditional path's instructions. Further, the membership information may be omitted if the size of the region is exactly double the number of instructions in each conditional path, which may be rendered equal in size by inserting NOPs in the shorter conditional path.

While the invention has been particularly shown and described with reference to the preferred embodiments thereof, it will be understood by those skilled in the art that the foregoing and other changes in form, and details may be made therein without departing from the spirit and scope of the invention.

What is claimed is:

1. A computer performed method performed by a general-purpose computer system that generates an output set of program code for execution by a processor having support for predicated operation, by ambiguously renaming predicated operations dispatched to one or more pipelines that write to a same specified register, the method comprising: detecting, within the general-purpose processing system, that a conditionally executed register-writing operation code is present in an input set of program code having at least two conditional paths of execution; inserting, into the output set of program code, one or more additional register-writing operation codes to provide each of the paths of execution with an operation that writes to the same register identified by the detected register-writing operation code, wherein the additional register-writing operation codes modify a value of the register identified by the detected register-writing operation code when executed by the processor; inserting, into the output set of program code, an executable predicated region identifying operation code that, when executed by the processor, identifies a region of instructions including the register-writing operation code and inserted additional register-writing operation codes to the processor, wherein the predicated region identifying operation code includes membership information identifying to which of the at least two conditional paths of execution the register-writing operation code and the one or more additional register-writing operation codes belongs whereby the processor, upon executing the executable predicated region identifying operation code and upon resolving a condition that determines which of the at least two conditional paths of execution to execute, executes selected ones of the register-writing operation code and inserted additional register-writing operation codes by selecting the selected ones of the register-writing operation code and inserted additional register-writing operation codes according to the membership information included in the executable predicated region identifying operation code; and storing the output set of program code in a memory of the general-purpose computer system.

2. The method of claim 1, wherein the executable predicated region identifying operation code includes an indication of the length of the region of instructions.

3. The method of claim 1, wherein the membership information is a field within the executable predicated region identifying operation code.

4. The method of claim 3, wherein the states of bits within the field specify associations of instructions within the output set of program code with the conditional paths of execution.

5. The method of claim 1, wherein the membership information is provided in an operand associated with the executable predicated region identifying operation code.

6. The method of claim 1, wherein the executable predicated region identifying operation code includes an associated indication of a value of a condition that determines which of the conditional paths of execution is to be taken in response to a condition resolution indication provided to the one or more pipelines.

7. A computer system comprising a processor for executing program instructions coupled to a memory for storing the program instructions, wherein the program instructions comprise program instructions for generating an output set of program code for execution by another processor having support for predicated operation by ambiguously renaming predicated write operations dispatched to one or more pipelines, wherein the program instructions comprise program instructions for: detecting that a conditionally executed register-writing operation code is present in an input set of program code having at least two conditional paths of execution; inserting, into the output set of program code, one or more additional register-writing operation codes to provide each of the paths of execution with an operation that writes to the same register identified by the detected register-writing operation code, wherein the additional register-writing operation codes modify a value of the register identified by the detected register-writing operation code when executed by the other processor; inserting, into the output set of program code, an executable predicated region identifying operation code identifying a region of instructions including the register-writing operation code and inserted additional register-writing operation codes to the other processor when executed by the other processor, wherein the predicated region identifying operation code includes membership information identifying to which of the at least two conditional paths of execution the register-writing operation code and the one or more additional register-writing operation codes belong, whereby the other processor, upon executing the executable predicated region identifying operation code and upon resolving a condition that determines which of the at least two conditional paths of execution to execute, executes selected ones of the register-writing operation code and inserted additional register-writing operation codes by selecting the selected ones of the register-writing operation code and inserted additional register-writing operation codes according to the membership information included in the executable predicated region identifying operation code; and storing the output set of program code in a memory of the computer system.

8. The computer system of claim 7, wherein the executable predicated region identifying operation code includes an indication of the length of the region of instructions.

9. The computer system of claim 7, wherein the membership information is a field within the executable predicated region identifying operation code.

10. The computer system of claim 9, wherein the states of bits within the field specify associations of instructions within the output set of program code with the conditional paths of execution.

11. The computer system of claim 7, wherein the membership information is provided in an operand associated with the executable predicated region identifying operation code.

12. The computer system of claim 7, wherein the executable predicated region identifying operation code includes an associated indication of a value of a condition that determines which of the conditional paths of execution is to be taken in response to a condition resolution indication provided to the one or more pipelines.

13. A computer program product comprising computer-readable memory, excluding signals and carrier waves, encoding program instructions for execution by a general-purpose computer system, wherein the program instructions comprise program instructions for generating an output set of program code for execution by a processor having support for predicated operation by ambiguously renaming predicated write operations dispatched to one or more pipelines, wherein the program instructions comprise program instructions for: detecting that a conditionally executed register-writing operation code is present in an input set of program code having at least two conditional paths of execution; inserting, into the output set of program code, one or more additional register-writing operation codes to provide each of the paths of execution with an operation that writes to the same register identified by the detected register-writing operation code, wherein the additional register-writing operation codes modify a value of the register identified by the detected register-writing operation code when executed by the processor; inserting, into the output set of program code, an executable predicated region identifying operation code identifying a region of instructions including the register-writing operation code and inserted additional register-writing operation codes to the processor when executed by the processor, wherein the predicated region identifying operation code includes membership information identifying to which of the at least two conditional paths of execution the register-writing operation code and the one or more additional register-writing operation codes belongs whereby the processor, upon executing the executable predicated region identifying operation code and upon resolving a condition that determines which of the at least two conditional paths of execution to execute, executes selected ones of the register-writing operation code and inserted additional register-writing operation codes by selecting the selected ones of the register-writing operation code and inserted additional register-writing operation codes according to the membership information included in the executable predicated region identifying operation code; and storing the output set of program code in a memory of the general-purpose computer system.

14. The computer program product of claim 13, wherein the executable predicated region identifying operation code includes an indication of the length of the region of instructions.

15. The computer program product of claim 13, wherein the membership information is a field within the executable predicated region identifying operation code.

16. The computer program product of claim 15, wherein the states of bits within the field specify associations of instructions within the output set of program code with the conditional paths of execution.

17. The computer program product of claim 13, wherein the membership information is provided in an operand associated with the executable predicated region identifying operation code.

18. The computer program product of claim 13, wherein the executable predicated region identifying operation code includes an associated indication of a value of a condition that determines which of the conditional paths of execution is to be taken in response to a condition resolution indication provided to the one or more pipelines.

19. The computer program product of claim 13, wherein the program instructions implement a compiler, wherein the input set of program code is a higher-level language representation from which the output set of program code is generated.

20. The computer program product of claim 13, wherein the program instructions implement a translator, wherein the input set of program code is a native machine language representation from which the output set of program code is generated.

\* \* \* \* \*